US007250609B2

(12) United States Patent
Dorenbos et al.

(10) Patent No.: US 7,250,609 B2
(45) Date of Patent: Jul. 31, 2007

(54) SCINTILLATOR CRYSTALS, METHOD FOR MAKING SAME, USE THEREOF

(75) Inventors: Pieter Dorenbos, GM Rijswijk (NL); Carel Wilhelm Eduard Van Eijk, LS Delft (NL); Hans-Ulrich Gudel, Thorishaus (CH); Karl Wilhelm Kramer, Bern (CH); Edgar Valentijn Dieuwer Van Loef, AP Rotterdam (NL)

(73) Assignee: Stichting Voor de Technische Wetenschappen, Utrecht (NL)

( * ) Notice: Subject to any disclaimer, the term of this patent is extended or adjusted under 35 U.S.C. 154(b) by 0 days.

(21) Appl. No.: 11/413,156

(22) Filed: Apr. 28, 2006

(65) Prior Publication Data
US 2006/0197026 A1    Sep. 7, 2006

Related U.S. Application Data

(62) Division of application No. 10/204,006, filed as application No. PCT/EP01/01838 on Feb. 16, 2001, now Pat. No. 7,067,816.

(30) Foreign Application Priority Data
Feb. 17, 2000   (NL) ................................. 1014401

(51) Int. Cl.
    G01T 1/20         (2006.01)
(52) U.S. Cl. ................................. 250/370.11
(58) Field of Classification Search .......... 250/370.11, 250/370.01, 370.12, 370.13, 483.1, 361 R, 250/484.1
    See application file for complete search history.

(56) References Cited

U.S. PATENT DOCUMENTS

| 3,959,442 A | 5/1976 | Pastor et al. |
| 3,978,337 A | 8/1976 | Nickles et al. |
| 4,251,315 A | 2/1981 | Pastor et al. |
| 4,337,397 A | 6/1982 | Vacher |
| 4,510,394 A | 4/1985 | Allemand et al. |
| 4,559,597 A | 12/1985 | Mullani |
| 4,563,582 A | 1/1986 | Mullani |
| 4,647,779 A | 3/1987 | Wong |
| 4,761,347 A | 8/1988 | Nakamura |
| 4,768,156 A | 8/1988 | Whitehouse et al. |
| 4,833,327 A | 5/1989 | Hart |
| 4,839,090 A | 6/1989 | Rosette et al. |
| 4,864,140 A | 9/1989 | Rogers et al. |
| 4,980,552 A | 12/1990 | Cho et al. |
| 5,015,860 A | 5/1991 | Moses |
| 5,015,880 A | 5/1991 | Drake et al. |
| 5,039,858 A | 8/1991 | Anderson et al. |
| 5,134,293 A | 7/1992 | Anderson et al. |
| 5,151,599 A | 9/1992 | Monnet et al. |
| 5,159,195 A | 10/1992 | Van House |
| 5,213,712 A | 5/1993 | Dole |
| 5,272,343 A | 12/1993 | Stearns |
| 5,272,344 A | 12/1993 | Williams |
| 5,319,203 A | 6/1994 | Anderson et al. |
| 5,326,974 A | 7/1994 | Karras et al. |
| 5,453,623 A | 9/1995 | Wong et al. |
| 5,478,498 A | 12/1995 | Kodama et al. |
| 5,532,489 A | 7/1996 | Yamashita et al. |
| 5,665,971 A | 9/1997 | Chen et al. |
| 5,786,600 A | 7/1998 | Lambert et al. |
| 5,821,541 A | 10/1998 | Turner |
| 5,841,140 A | 11/1998 | McCroskey et al. |
| 5,869,836 A | 2/1999 | Linden et al. |
| 5,882,547 A | 3/1999 | Lynch et al. |
| 5,911,824 A | 6/1999 | Hammond et al. |
| 6,072,177 A | 6/2000 | McCroskey et al. |
| 6,093,245 A | 7/2000 | Hammond et al. |
| 6,236,050 B1 | 5/2001 | Tumer |
| 6,255,655 B1 | 7/2001 | McCroskey et al. |
| 6,323,489 B1 | 11/2001 | McClellan |
| 6,362,479 B1 | 3/2002 | Andreaco et al. |
| 6,420,711 B2 | 7/2002 | Tumer |

(Continued)

FOREIGN PATENT DOCUMENTS

DE        44 43 001        6/1995

(Continued)

OTHER PUBLICATIONS

Van Eijk, et al., "Energy resolution of some new inorganic-scintillator gamma-ray detectors," Radiation Measurements, vol. 33, pp. 521-525 (2001).

(Continued)

Primary Examiner—David Porta
Assistant Examiner—Marcus Taningco
(74) Attorney, Agent, or Firm—Oblon, Spivak, McClelland, Maier & Neustadt, P.C.

(57) ABSTRACT

The invention concerns an inorganic scintillator material of general composition $M_{1-x}Ce_xBr_3$, wherein: M is selected among lanthanides or lanthanide mixtures of the group consisting of La, Gd, Y in particular among lanthanides or lanthanide mixtures of the group consisting of La, Gd; and x is the molar rate of substitution of M with cerium, x being not less that 0.01 mol % and strictly less than 100 mol %. The invention also concerns a method of growing such a monocrystalline scintillator material, and the use of same as component of a scintillating detector for industrial and medical purpose or in the oil industry.

76 Claims, No Drawings

U.S. PATENT DOCUMENTS

| | | |
|---|---|---|
| 6,437,336 B1 | 8/2002 | Pauwels et al. |
| 6,448,560 B1 | 9/2002 | Tumer |
| 6,451,106 B1 | 9/2002 | Mayolet et al. |
| 6,585,913 B2 | 7/2003 | Lyons et al. |
| 6,624,420 B1 | 9/2003 | Chai et al. |
| 6,624,422 B2 | 9/2003 | Williams et al. |
| 6,699,406 B2 | 3/2004 | Riman et al. |
| 2002/0156279 A1 | 10/2002 | Boussie et al. |
| 2003/0211369 A1 | 11/2003 | Riman et al. |
| 2005/0082484 A1 | 4/2005 | Srivastava et al. |
| 2005/0104001 A1* | 5/2005 | Shah .................. 250/363.03 |
| 2005/0104002 A1 | 5/2005 | Shah |
| 2005/0188914 A1* | 9/2005 | Iltis et al. .................. 117/2 |
| 2006/0104880 A1* | 5/2006 | Iltis ............................ 423/263 |
| 2006/0197026 A1 | 9/2006 | Dorenbos et al. |

FOREIGN PATENT DOCUMENTS

| | | |
|---|---|---|
| DK | 1014401 | 2/2000 |
| JP | 03 285898 | 12/1991 |
| JP | 06-135715 | 5/1994 |
| SU | 1 273 779 | 11/1986 |
| WO | 01/60944 | 8/2001 |
| WO | 01/60945 | 8/2001 |

OTHER PUBLICATIONS

Korczak, et al. "Crystal growth and temperature variation of the lattice parameters in LaF3, CeF3, PrF3 and NdF3" Journal of Crystal Growth, vol. 61, No. 3, pp. 601-605, 1983.

Blistanov A.A., et al. "Peculiarities of the growth of disordered Na, R-fluorite (R=Y, Ce-Lu) single crystals" Journal of Crystal Growth, vol. 237-239, pp. 899-903, Apr. 2002.

Duffy S., et al. "Bridgman growth and laser excitation of LiYF4:Sm3+" Journal of Crystal Growth, vol. 203, No. 3, pp. 405-411, Jun. 1999.

"Scintillation Properties of $LaCl_3:Ce^{3+}$ Crystals: Fast, Efficient, and High-Energy Resolution Scintillators," E.V.D. van Loef et al., IEEE Transactions on Nuclear Science, vol. 48, No. 3, Jun. 2001, pp. 341-345.

"High-Energy-Resolution Scintillator: $Ce^{3+}$ Activated $LaCl_3$," E.V. D. van Loef et al., Applied Physics Letters, vol. 77, No. 10, September 2000, pp. 1467-1468.

"High-Energy-Resolution Scintillator: $Ce^{3+}$ Activated $LaBr_3$," E.V. D. van Loef et al., Applied Physics Letters, vol. 79, No. 10, Sep. 2001, pp. 1573-1575.

Allemand, R. et al., "Potential advantages of a cesium fluoride scintillator for a time-of-flight positron camera," J. Nucl. Med., 21:153:155 (1980).

Bollinger, L. and Thomas, G., "Measurement of the time dependence of scintillation intensity by a delayed-coincidence method," Rev. Sci. Instrum., 32:1044-1050 (Sep. 1961).

Budinger, T., "Time-of-flight positron emission tomography: status relative to conventional PET," J. Nucl. Med., 24:73-78 (Jan. 1983).

Burnham, C. et al., "New instrumentation for positron scanning," International Conference on Radioisotopes in Localization of Tumors, England, Sep. 25-27 (1967).

Detko, J.F., "Operational characteristics of a small ultra-pure germanium gamma camera," Semiconductor Detectors in Medicine, Mar. 8-9 (1973), U.S. Atomic Energy Commission Office of Information Services Technical Information Center.

Dorenbos, P. et al., "Non-proportionality in the scintillation response and the energy resolution obtainable with scintillation crystals," IEEE Trans. Nucl. Sci., 42:2190-2202 (Dec. 1995).

Gariod, R. et al., "The 'LETI' positron tomography architecture and time of flight improvements," Workshop on Time-of-Flight Positron Tomography, May 17-19 (1982), Washington University, St. Louis, Missouri, IEEE Catalog No. 82CH1719-3.

Guillot-Nöel, O. et al., "Scintillation properties of $RbGd_2Br_7$ :Ce advantages and limitations," IEEE Trans. Nucl. Sci., 46:1274-1284 (Oct. 1999).

Kaufman, L. et al., "Delay line readouts for high purity germanium medical imaging cameras," IEEE Trans. Nucl. Sci., NS-21:652-657 (Feb. 1974).

Lewellen, TK, "Time-of-flight PET," Semin. Nucl. Med., 28:268-275 (Jul. 1998).

Lewellen, TK et al., "Performance measurements of the SP3000/UW time-of-flight positron emission tomograph," IEEE Trans. Nucl. Sci., 35:665-669 (Feb. 1988).

Moses, W. and Derenzo, S., "Scintillators for positron emission tomography," Proceedings of SCINT '95, Delft, The Netherlands, pp. 9-16 (1996).

Moses, W. et al., "Gamma ray spectroscopy and timing using LSO and PIN photodiodes," IEEE Trans. Nucl. Sci., NS-42:597-600 (1995).

Moses, W. et al., "$LuAlO_3$ :Ce—a high density, high speed scintillator for gamma detection, IEEE Trans. Nucl. Sci., NS-42:275-279 (1995).

Moses, W. et al., "Performance of a PET detector module module with LSO scintillator crystals and photodiode readout," J. Nucl. Med., 37:85P (1996).

Moses, W. and Derenzo, S., "Prospects for time-of-flight PET using LSO scintillator," IEEE Trans. Nucl. Sci., NS-46:474-478 (1999).

Mullani, N. et al., "Dynamic imaging with high resolution time-of-flight PET camera—TOFPET I," IEEE Trans. Nucl. Sci., NS-31:609-613 (Feb. 1984).

Phelps, M., "Positron emission tomography provides molecular imaging of biological processes," PNAS, 97:9226-9233 (Aug. 1, 2000).

Shah, K. et al., "$LuI_3$ :Ce—A new scintillator for gamma ray spectroscopy," 4 pages (Oct. 29, 2003).

Dorenbos, "Light output and energy resolution of $Ce^{3+}$-doped scintillators," Nuclear Instruments and Methods in Physics Research A, vol. 486, pp. 208-213 (2002).

Andriessen, J. et al., "Experimental and theoretical study of the spectroscopic properties of Ce3+ doped LaCl3 single crystals," Optics Communications, vol. 178, No. 4-6, pp. 355-363, May 2000, XP004204283.

Meyer, Gerd et al., "The ammonium chloride route to anhydrous rare earth chlorides—the example of YCl3," Inorg. Synth., vol. 25, pp. 146-150, 1989, XP008021415.

Meyer, Gerd et al., "The ammonium-bromide route to anhydrous rare earth bromides MBr3," Journal of the Less Common Metals, vol. 127, pp. 155-160, 1987, XP 008021446.

Egger, P. et al., "Czochralski growth of Ba2Y1 -xErxCl7 ($0 < x \leq 1$) using growth equipment integrated into a dry-box," Journal of Crystal Growth, vol. 22, No. 3-4, pp. 515-520, Apr. 1999, XP, 004168216.

Weber, M. et al., "Dense $Ce^{3+}$-activated scintillator materials," Proceedings of SCINT '95, Delft, The Netherlands, pp. 325-328 (1996).

Wong, W. et al., "Characteristics of small barium fluoride (BaF) scintillator for high intrinsic resolution time-of-flight positron emission tomography," IEEE Trans. Nucl. Sci., NS-31:381-386 (Feb. 1984).

Yamamoto, M. et al., "Time-of-flight positron imaging and the resolution improvement by an interactive method," IEEE Trans. Nucl. Sci., 36(1):998-1002 (Feb. 1989).

Shah, K. et al., "$LaBr_3$ :Ce scintillators for gamma ray spectroscopy,"IEEE Trans. Nucl. Sci., LBNL-51793, 4 pages (Dec. 2, 2002).

Surti, S. et al., "Image quality assessment of $LaBr_3$-based whole-body 3D PET scanners: a Monte Carlo evaluation," Phys. Med. Biol., 49:4593-4610 (2004).

Van Loef, E. et al., "Scintillation properties of $LaBr_3:Ce^{3+}$ crystals: fast, efficient and high-energy-resolution scintillators," Nucl. Instr. Meth. Physics Res. A, 486:254-258 (2002).

N. Pelletier-Allard et al.: "Multiphoton excitations in neodymium chlorides" Physical Review, vol. 36, No. 8, pp. 4425-4427.

J. Magn. Mater, vol. 127, No. 1-2, pp. 168-168, XP-002176465 (abstract only) 1993.

O. Guillot-Noel et al.: "Optical and scintillation properties of cerium-doped LaCl3, LuBr3 and LuCl3" Journal of Luminescence, vol. 85, pp. 21-35.

C.W.E. Van Eijk: "Development of inorganic scintillators" Nuclear Instruments & Methods In Physics Research, Section -A: Accelerators, Spectrometers, Detectors and Associated Equipment, vol. 392, No. 1-3, pp. 285-290 Jun. 21, 1997.

Database Inspec 'Online!, Institute of Electrical Engineers as Voloshinovskii et al.: "Luminescence properties of cerium chloride" Database accession No. 4726740, XP002150542 (abstract only).

U.S. Appl. No. 10/559,338, filed Nov. 17, 2006, Dorenbos, et al.

U.S. Appl. No. 11/578,379, filed Oct. 13, 2006, Iltis.

U.S. Appl. No. 11/413,166, filed Apr. 28, 2006, Dorenbos, et al.

U.S. Appl. No. 11/413,156, filed Apr. 28, 2006, Dorenbos, et al.

* cited by examiner

SCINTILLATOR CRYSTALS, METHOD FOR MAKING SAME, USE THEREOF

The present invention relates to scintillator crystals, to a manufacturing method allowing them to be obtained and to the use of said crystals, especially in gamma-ray and/or X-ray detectors.

Scintillator crystals are widely used in detectors for gamma-rays, X-rays, cosmic rays and particles whose energy is of the order of 1 keV and also greater than this value.

A scintillator crystal is a crystal which is transparent in the scintillation wavelength range, which responds to incident radiation by emitting a light pulse.

From such crystals, generally single crystals, it is possible to manufacture detectors in which the light emitted by the crystal that the detector comprises is coupled to a light-detection means and produces an electrical signal proportional to the number of light pulses received and to their intensity. Such detectors are used especially in industry for thickness or weight measurements and in the fields of nuclear medicine, physics, chemistry and oil exploration.

A family of known scintillator crystals widely used is of the thallium-doped sodium iodide Tl:NaI type. This scintillating material, discovered in 1948 by Robert Hofstadter and which forms the basis of modern scintillators, still remains the predominant material in this field in spite of almost 50 years of research on other materials. However, these crystals have a scintillation decay which is not very fast.

A material which is also used is CsI which, depending on the applications, may be used pure, or doped either with thallium (Tl) or with sodium (Na).

One family of scintillator crystals which has undergone considerable development is of the bismuth germanate (BGO) type. The crystals of the BGO family have high decay time constants; which limit the use of these crystals to low count rates.

A more recent family of scintillator crystals was developed in the 1990s and is of the cerium-activated lutetium oxyorthosilicate Ce:LSO type. However these crystals are very heterogeneous and have very high melting points (about 2200° C.).

The development of new scintillating materials for improved performance is the subject of many studies.

One of the parameters that it is desired to improve is the energy resolution.

This is because in the majority of nuclear detector applications, good energy resolution is desired. The energy resolution of a nuclear radiation detector actually determines its ability to separate radiation energies which are very close. It is usually determined for a given detector at a given energy, such as the width at mid-height of the peak in question on an energy spectrum obtained from this detector, in relation to the energy at the centroid of the peak (see in particular: G. F. Knoll, "Radiation Detection and Measurement", John Wiley and Sons, Inc., 2nd edition, p. 114). In the rest of the text, and for all measurements carried out, the resolution is determined at 662 keV, the energy of the main gamma emission of $^{137}$Cs.

The smaller the energy resolution, the better the quality of the detector. It is considered that energy resolutions of about 7% enable good results to be obtained. Nevertheless, lower values of resolution are of great benefit.

For example, in the case of a detector used to analyze various radioactive isotopes, improved energy resolution enables improved discrimination of these isotopes.

An increase in the energy resolution is particularly advantageous for a medical imaging device, for example of the Anger gamma-camera or positron emission tomography (PET) type, since it enables the contrast and the quality of the images to be considerably improved, thus allowing more accurate and earlier detection of tumors.

Another very important parameter is the scintillation decay time constant; this parameter is usually measured by the "Start Stop" or "Multi-hit" method", (described by W. W. Moses (Nucl. Instr and Meth. A336 (1993)253).

The smallest possible decay time constant is desired, so as to be able to increase the operating frequency of the detectors. In the field of nuclear medical imaging, this makes it possible, for example, to considerably reduce the length of examinations. A decay time constant which is not very high also enables the temporal resolution of devices detecting events with temporal coincidence to be improved. This is the case for positron emission tomographs (PET), where the reduction in the scintillator decay time constant enables the images to be significantly improved by rejecting noncoincident events with more accuracy.

In general, the spectrum of scintillation decay as a function of time may be broken down into a sum of exponentials, each characterized by a decay time constant.

The quality of a scintillator is essentially determined by the properties of the contribution from the fastest emission component.

The standard scintillating materials do not allow both good energy resolutions and fast decay time constants to be obtained.

This is because materials such as Tl:NaI have good energy resolution under gamma excitation, of about 7%, but a high decay time constant of about 230 ns. Similarly, Tl:CsI and Na:CsI have high decay time constants, especially greater than 500 ns.

Decay time constants which are not very high can be obtained with Ce:LSO, especially of about 40 ns, but the energy resolution under gamma excitation at 662 keV of this material is generally greater than 10%.

Recently, scintillating materials have been disclosed by O. Guillot-Noël et al. ("Optical and scintillation properties of cerium doped $LaCl_3$, $LuBr_3$ and $LuCl_3$," in Journal of Luminescence 85 (1999) 21-35). This article describes the scintillation properties of cerium-doped compounds such as $LaCl_3$ doped with 0.57 mol % Ce; $LuBr_3$ doped with 0.021 mol %, 0.46 mol % and 0.76 mol % Ce; $LuCl_3$ doped with 0.45 mol % Ce. These scintillating materials have quite useful energy resolutions, of the order of 7%, and decay time constants of the fast scintillation component which are fairly low, especially between 25 and 50 ns. However, the intensity of the fast component of these materials is low, especially of the order of 1000 to 2000 photons per MeV, which means that they cannot be used as a component of a high-performance detector.

The object of the present application relates to a material capable of having a low decay time constant, especially at least equivalent to that of Ce:LSO, and where the intensity of the fast scintillation component is suitable for producing a high-performance detector, in particular is greater than 4000 ph/MeV (photons per MeV), or even greater than 8000 ph/MeV (photons per MeV) and, in a preferred manner, a good energy resolution, especially at least as good as that of Tl:NaI.

According to the invention, this aim is achieved by an inorganic scintillating material of general composition $M_{1-x}Ce_xBr_3$, where M is chosen from the lanthanides or mixtures of lanthanides of the group: La, Gd, Y, especially chosen from the lanthanides or the mixtures of lanthanides of the group: La, Gd, and where x is the molar level of substitution of M by cerium, subsequently called "cerium content", where x is greater than or equal to 0.01 mol % and strictly less than 100 mol %.

The term "lanthanide" refers to the transition elements of atomic numbers 57 to 71, and to yttrium (Y), as is standard in the technical field of the invention.

An inorganic scintillating material according to the invention substantially consists of $M_{1-x}Ce_xBr_3$ and may also comprise impurities usual in the technical field of the invention. In general, the usual impurities are impurities coming from the raw materials whose content is in particular less than 0.1%, or even less than 0.01%, and/or the unwanted phases whose volume percentage is especially less than 1%.

In fact, the inventors have known how to show that the $M_{1-x}Ce_xBr_3$ compounds defined above, comprising cerium, have remarkable properties. The scintillation emission of these materials has an intense fast component (of at least 10000 ph/MeV) and a low decay time constant, of the order of 20 to 40 ns.

A preferred material according to the invention has the formula $La_{1-x}Ce_xBr_3$; in fact this material has simultaneously an excellent energy resolution at 662 keV, in particular less that 5%, and even than 4%.

According to one embodiment, the scintillating material according to the invention has an energy resolution of less than 5% at 662 keV.

According to another embodiment, the scintillating material according to the invention has a fast decay time constant of less than 40 ns, or even of less than 30 ns.

According to a preferred embodiment, the scintillating material according to the invention has both an energy resolution less than 5% at 662 keV and a fast decay time constant of less than 40 ns, or even less than 30 ns.

In a preferred manner, the cerium content x is at least 1 mol % and is in particular between 1 and 90 mol %, and even in particular greater than or equal to 2 mol %, or even greater than or equal to 4 mol % and/or preferably less than or equal to 50 mol %, or even less than or equal to 30 mol %.

According to another embodiment, the cerium content x is between 0.01 mol % and 1 mol %, in particular at least equal to 0.1 mol %, even at least equal to 0.2 mol %. In a preferred manner, the cerium content is substantially equal to 0.5 mol %.

According to one embodiment, the scintillating material according to the invention is a single crystal making it possible to obtain components of high transparency, the dimensions of which are enough to efficiently stop and detect the radiation to be detected, including at high energy. The volume of these single crystals is in particular of the order of 10 mm³, or even greater than 1 cm³ and even greater than 10 cm³.

According to another embodiment, the scintillating material according to the invention is a powder or polycrystal, for example in the form of powders mixed with a binder or else in the form of a sol-gel.

The invention also relates to a method for obtaining the scintillating material $M_{1-x}Ce_xCl_3$, defined above, in the form of a single crystal by the Bridgman growth method, for example in evacuated sealed quartz ampoules, in particular from a mixture of commercial $MBr_3$ and $CeBr_3$ powders.

The invention also relates to the use of the scintillating material above as a component of a detector for detecting radiation in particular by gamma rays and/or X-rays.

Such a detector especially comprises a photodetector optically coupled to the scintillator in order to produce an electrical signal in response to the emission of a light pulse produced by the scintillator.

The photodetector of the detector may in particular be a photomultiplier, or else a photodiode, or else a CCD sensor.

The preferred use of this type of detector relates to the measurement of gamma or X-ray radiation; such a system is also capable of detecting alpha and beta radiation and electrons. The invention also relates to the use of the above detector in nuclear medicine apparatuses, especially gamma cameras of the Anger type and positron emission tomography scanners (see for example C. W. E. Van Eijk, "Inorganic Scintillator for Medical Imaging", International Seminar New types of Detectors, 15-19 May 1995—Archamp, France. Published in "Physica Medica", Vol. XII, supplement 1, June 96).

According to another variant, the invention relates to the use of the above detector in detection apparatuses for oil drilling, (see for example "Applications of scintillation counting and analysis", in "Photomultiplier tube, principle and application", chapter 7, Philips).

Other details and characteristics will emerge from the description below of preferred nonlimiting embodiments and of data obtained on samples constituting single crystals according to the invention.

Table 1 shows the characteristic scintillation results for examples according to the invention (examples 1 to. 5) and for comparative examples (examples A to G).

x is the cerium content, expressed in mol %, substituted into the atom M.

The measurements are carried out under γ-ray excitation at 662 keV. The measurement conditions are specified in the publication by O. Guillot-Noël, cited above.

The emission intensity is expressed in photons per MeV.

The emission intensity is recorded as a function of the integration time up to 0.5; 3 and 10 microseconds.

The fast scintillation component is characterized by its decay time constant, τ, in nanoseconds, and by its scintillation intensity (in photons/MeV), which represents the contribution of this component to the total number of photons emitted by the scintillator.

The samples used in the measurements of examples are small single crystals of about 10 mm³.

From table 1, it is noticed that the compounds according to the invention of the $M_{1-x}Ce_xBr_3$ type comprising cerium (ex1 to ex5) all have very advantageous decay time constants of fast fluorescence component, between 20 and 40 ns and the scintillation intensity of this fast component is remarkable and is very much greater than 10000 ph/MeV: in fact it reaches about 40000 ph/MeV.

In addition, the resolution, R %, of the examples according to the invention (ex1 to ex4) where M=La, is excellent and has an unexpected nature, with values between 3 and 4%, which is a considerable improvement with respect to Tl:NaI.

This is because the known lanthanide bromide compounds (examples A, B and C) do not have as remarkable a set of scintillation characteristics. For example, the cerium-doped lutetium bromides (examples B and C) have a good resolution, R %, but the intensity of the fast component is low, very substantially less that 4000 ph/MeV. As for the known lanthanide fluorides (examples D, E, F, G), they have a very low emission intensity.

In a particularly surprising manner, the inventors noticed a considerable increase in the intensity of the fast emission component for the La and Gd bromides containing cerium.

The scintillating materials according to the invention, in particular the materials of general composition $La_{1-x}Ce_xBr_3$ have a performance which is particularly suitable for increasing the performance of detectors, both in terms of energy resolution, temporal resolution and count rate.

TABLE 1

| Example | Matrix | x: mol % Ce³⁺ | Emission Intensity (photons/MeV) 0.5 µs | 3 µs | 10 µs | Resolution: (R %) | Fast Component τ(ns) | Intensity (ph/MeV) |
|---|---|---|---|---|---|---|---|---|
| ex1 | LaBr₃ | 0.5 | 63000 | 63000 | 63000 | 3 | 35 | 56700 |
| ex2 | LaBr₃ | 2 | 48000 | 48000 | 48000 | 4 | 23 | 43700 |
| ex3 | LaBr₃ | 4 | 48000 | 48000 | 48000 | 3.7 | 21 | 44200 |
| ex4 | LaBr₃ | 10 | 45000 | 45000 | 45000 | 3.9 | 24 | 41400 |
| ex5 | GdBr₃ | 2 | 28000 | 38000 | 44000 | >20 | 20 | 11400 |
| A | LaBr₃ | 0 | 13000 | 17000 | 17000 | 15 | 365 | 11200 |
| B | LuBr₃ | 0.46 | 9000 | 14000 | 18000 | 7.8 | 32 | 1800 |
| C | LuBr₃ | 0.76 | 10000 | 17000 | 24000 | 6.5 | 32 | 2400 |
| D | LaF₃ | 1 | ≈440 | ≈440 | 440 | >20 | 3 | >100 |
| E | LaF₃ | 10 | ≈2200 | ≈2200 | 2200 | >20 | 3 | >300 |
| F | LaF₃ | 50 | ≈1900 | ≈1900 | 1900 | >20 | 3 | >200 |
| G | CeF₃ | 100 | ≈4400 | ≈4400 | 4400 | >20 | 3 | >200 |

The invention claimed is:

1. A method of detecting radiation, comprising the steps of:
    receiving said radiation with an inorganic scintillating material comprising $M_{1-x}Ce_xBr_3$, where M is selected from the group consisting of La, Gd, Y, and mixtures thereof, and where x is the molar level of substitution of M by cerium, where x is greater than or equal to 0.01 mol % and less than 100 mol %;
    emitting light with said inorganic scintillating material in response to said step of receiving said radiation, wherein said emitted light has a fast scintillation component having an emission intensity of at least 4000 photons per MeV; and
    detecting said light with a photodetector.

2. The method as claimed in claim 1, wherein M is lanthanum (La).

3. The method as claimed in claim 1, wherein x is greater than or equal to 1 mol %.

4. The method as claimed in claim 1, wherein x is greater than or equal to 2 mol %.

5. The method as claimed in claim 1, wherein x is greater than or equal to 4 mol %.

6. The method as claimed in claim 1, wherein x is less than or equal to 90 mol %.

7. The method as claimed in claim 1, wherein the energy resolution of the inorganic scintillating material is less than 5% for a measurement with gamma photons at 662 keV.

8. The method as claimed in claim 1, wherein x is greater than or equal to 2 mol % and wherein M is lanthanum (La).

9. The method as claimed in claim 1, wherein x is greater than or equal to 4 mol % and wherein M is lanthanum (La).

10. The method as claimed in claim 1, wherein the fast scintillation component has an emission intensity of at least 8000 photons per MeV.

11. The method as claimed in claim 1, wherein the fast scintillation component has an emission intensity of at least 10000 photons per MeV.

12. The method as claimed in claim 1, wherein the fast scintillation component has a decay time constant of at most 30 ns.

13. The method of claim 1, wherein the inorganic scintillating material has an energy resolution of at most 4% at 662 keV.

14. The method of claim 1, wherein the fast scintillation component has an emission intensity of at least 8000 photons per MeV and a decay time constant of at most 30 ns.

15. The method of claim 1, wherein the inorganic scintillating material consists of $M_{1-x}Ce_xCl_3$.

16. A method of detecting radiation, comprising the steps of:
    exposing an inorganic scintillating material to radiation, the inorganic scintillating material comprising M, Ce, and Br, where M is selected from the group consisting of La, Gd, Y, and mixtures thereof, and where Ce is partially substituted for M, a molar level of substitution of Ce for M being greater than or equal to 0.01 mol % and less than 100 mol %, such that the inorganic scintillating material emits light, wherein the light has a fast scintillation component having an emission intensity of at least 4000 photons per MeV; and
    detecting the light with a photodetector.

17. The method of claim 16, wherein an energy resolution of the inorganic scintillating material is less than 5% for a measurement with gamma photons at 662 keV.

18. The method of claim 17, wherein an energy resolution of the inorganic scintillating material is less than 4%.

19. The method of claim 16, wherein the fast scintillation component has an emission intensity of at least 8000 photons per MeV.

20. The method of claim 19, wherein the fast scintillation component has an emission intensity of at least 10000 photons per MeV.

21. The method of claim 16, wherein the fast scintillation component has a decay time constant of at most 30 ns.

22. An inorganic scintillating material comprising $M_{1-x}Ce_xBr_3$, where M is selected from the group consisting of La, Gd, Y, and mixtures thereof and where x is the molar level of substitution of M by cerium, where x is greater than or equal to 0.01 mol % and less than 100 mol %.

23. The scintillating material as claimed in claim 22, wherein M is lanthanum (La).

24. The scintillating material as claimed in claim 22, wherein 2 mol % ≦ x ≦ 30 mol %.

25. The scintillating material as claimed in claim 22, wherein 0.01 mol % ≦ x ≦ 1 mol %.

26. The scintillating material as claimed in claim 22, wherein the scintillating material is a single crystal having a volume greater than 10 mm³.

27. The scintillating material as claimed in claim 22, wherein the scintillating material is a powder or a polycrystal.

28. A method of growing the single crystal scintillating material as claimed in claim 27, wherein the single crystal is obtained by the Bridgman growth method in evacuated sealed quartz ampoules from a mixture of MBr₃ and CeBr₃ powders.

29. A scintillation detector comprising the scintillating material as claimed in claim 22.

30. A positron emission tomography scanner or a gamma camera of the Anger type comprising the scintillating material as claimed in claim 22.

31. The inorganic scintillating material as claimed in claim 22, wherein M is selected from the group consisting of La, Gd, and mixtures thereof.

32. The scintillating material as claimed in claim 22, wherein x is less than or equal to 90 mol %.

33. The scintillating material as claimed in claim 22, wherein x is less than or equal to 50 mol %.

34. The scintillating material as claimed in claim 22, wherein x is less than or equal to 30 mol %.

35. The scintillating material as claimed in claim 22, wherein x is less than or equal to 0.1 mol %.

36. The scintillating material as claimed in claim 22, wherein x is substantially equal to 0.5 mol %.

37. The scintillating material as claimed in claim 22, wherein the scintillating material is a single crystal having a volume greater than 1 cm$^3$.

38. An inorganic scintillating material consisting essentially of $M_{1-x}Ce_xBr_3$,
where M is selected from the group consisting of La, Gd, Y, and mixtures thereof and where x is the molar level of substitution of M by cerium, where x is greater than or equal to 0.01 mol % and less than 100 mol %.

39. The scintillating material as claimed in claim 38, wherein M is lanthanum (La).

40. The scintillating material as claimed in claim 38, wherein 2 mol % $\leq$ x $\leq$ 30 mol %.

41. The scintillating material as claimed in claim 38, wherein 0.01 mol % $\leq$ x $\leq$ 1 mol %.

42. The scintillating material as claimed in claim 38, wherein the scintillating material is a single crystal greater than 10 mm$^3$.

43. The scintillating material as claimed in claim 38, wherein the scintillating material is a powder or a polycrystal.

44. A method of growing the single crystal scintillating material as claimed in claim 42, wherein the single crystal is obtained by the Bridgman growth method in evacuated sealed quartz ampoules from a mixture of MBr$_3$ and CeBr$_3$ powders.

45. A scintillation detector comprising the scintillating material as claimed in claim 38.

46. A positron emission tomography scanner or a gamma camera of the Anger type comprising the scintillating material as claimed in claim 38.

47. The inorganic scintillating material as claimed in claim 38, wherein M is selected from the group consisting of La, Gd, and mixtures thereof.

48. The scintillating material as claimed in claim 38, wherein x is less than or equal to 90 mol %.

49. The scintillating material as claimed in claim 38, wherein x is less than or equal to 50 mol %.

50. The scintillating material as claimed in claim 38, wherein x is less than or equal to 30 mol %.

51. The scintillating material as claimed in claim 38, wherein x is less than or equal to 0.1 mol %.

52. The scintillating material as claimed in claim 38, wherein x is substantially equal to 0.5 mol %.

53. The scintillating material as claimed in claim 38, wherein the scintillating material is a single crystal having a volume greater than 1 cm$^3$.

54. The scintillating material as claimed in claim 22, wherein said inorganic scintillating material consists of $M_{1-x}Ce_xBr_3$.

55. The scintillating material as claimed in claim 23, wherein said inorganic scintillating material consists of $La_{1-x}Ce_xBr_3$.

56. An inorganic scintillating material comprising M, Ce, and Br, wherein M is selected from the group consisting of La, Gd, Y, and combinations thereof, and Ce is partially substituted for M, a molar level of substitution of Ce for M being greater than or equal to 0.01 mol % and less than 100 mol %.

57. The inorganic scintillating material of claim 56, wherein M is selected from the group consisting of La, Gd, and combinations thereof.

58. The inorganic scintillating material of claim 57, wherein M comprises La.

59. The inorganic scintillating material of claim 56, wherein the molar level of substitution of Ce for M is not less than 2 mol % and not greater than 30 mol %.

60. The inorganic scintillating material of claim 56, wherein the molar level of substitution of Ce for M is not less than 0.01 mol % and not greater than 1 mol %.

61. The inorganic scintillating material of claim 56, wherein the scintillating material is a single crystal having a volume greater than 10 mm$^3$.

62. The inorganic scintillating material of claim 61, wherein the scintillating material is a single crystal having a volume greater than 1 cm$^3$.

63. The inorganic scintillating material of claim 56, wherein the scintillating material is a powder or a polycrystalline material.

64. A scintillation detector comprising the scintillating material as claimed in claim 56.

65. A positron emission tomography scanner or a gamma camera of an Anger type comprising the scintillating material as claimed in claim 56.

66. The scintillating material of claim 56, wherein the molar level of substitution of Ce for M is less than or equal to 90 mol %.

67. The scintillating material of claim 56, wherein the molar level of substitution of Ce for M is less than or equal to 50 mol %.

68. The scintillating material of claim 56, wherein the molar level of substitution of Ce for M is less than or equal to 30 mol %.

69. The scintillating material of claim 56, wherein the molar level of substitution of Ce for M is less than or equal to 0.1 mol %.

70. The scintillating material of claim 56, the molar level of substitution of Ce for M is substantially equal to 0.5 mol %.

71. The scintillating material of claim 56, wherein the inorganic scintillating material consists essentially of M, Ce, and Br.

72. The scintillating material of claim 56, wherein said inorganic scintillating material comprises $M_{1-x}Ce_xBr_3$.

73. The method of claim 16, wherein the molar level of substitution of Ce for M is greater than or equal to 1 mol %.

74. The scintillating material as claimed in claim 22, wherein x is greater than or equal to 1 mol %.

75. The scintillating material as claimed in claim 38, wherein x is greater than or equal to 1 mol %.

76. The inorganic scintillating material of claim 56, wherein the molar level of substitution of Ce for M is greater than or equal to 1 mol %.

* * * * *